United States Patent
Sandhu

(10) Patent No.: US 7,524,119 B2
(45) Date of Patent: Apr. 28, 2009

(54) APPARATUS AND METHOD FOR VIEWING RADIOGRAPHS

(75) Inventor: Gurpal (Paul) Sandhu, Honolulu, HI (US)

(73) Assignee: Paul Sandhu, Honolulu, HI (US)

( * ) Notice: Subject to any disclaimer, the term of this patent is extended or adjusted under 35 U.S.C. 154(b) by 373 days.

(21) Appl. No.: 11/345,900

(22) Filed: Feb. 2, 2006

(65) Prior Publication Data

US 2006/0181776 A1 Aug. 17, 2006

Related U.S. Application Data

(60) Provisional application No. 60/649,521, filed on Feb. 3, 2005.

(51) Int. Cl.
*G03B 37/00* (2006.01)

(52) U.S. Cl. .......................... 396/427; 348/143; 40/361

(58) Field of Classification Search .................... 40/361; 382/132; 378/98, 98.2, 98.3, 98.5, 176, 190; 396/427, 428; 348/143, 211.99, 211.8
See application file for complete search history.

(56) References Cited

U.S. PATENT DOCUMENTS

| | | | | |
|---|---|---|---|---|
| 4,849,794 A | * | 7/1989 | Greene et al. | 355/75 |
| 5,940,998 A | * | 8/1999 | Brauer | 40/361 |
| 5,992,066 A | * | 11/1999 | Brauer | 40/361 |
| 6,434,329 B1 | * | 8/2002 | Dube et al. | 396/14 |
| 2006/0038141 A1 | * | 2/2006 | Blume | 250/559.02 |

* cited by examiner

*Primary Examiner*—Melissa J Koval
*Assistant Examiner*—Fang-Chi Chang
(74) *Attorney, Agent, or Firm*—Nixon Peabody, LLP

(57) ABSTRACT

In one aspect, a telesuite is provided and includes a camera rotatable about at least one axis, the camera being rotatably mounted to a base, and a radiograph viewing device. The radiograph viewing device includes a light source and a translucent substrate defining at least one radiograph viewing area. Each radiograph viewing area of the translucent substrate is disposed substantially equidistant from the camera.

10 Claims, 6 Drawing Sheets

APPARATUS AND METHOD FOR VIEWING RADIOGRAPHS

CROSS-REFERENCE To RELATED APPLICATION

This application claims the benefit of the U.S. Provisional Application 60/649,521 filed on Feb. 3, 2005 and entitled "Apparatus And Method For Viewing Radiographs" and this provisional application is hereby incorporated by reference in its entirety.

FIELD OF THE INVENTION

This disclosure generally relates to medical diagnostic apparatuses, systems and methods. This disclosure particularly relates to apparatuses, systems and methods for local and remote viewing of radiographs.

BACKGROUND OF THE INVENTION

Transparency illuminators, view boxes, light boxes, and the likes are used to permit viewing of negative images. Medical applications utilize such light boxes to permit radiologists and other qualified health care practitioners to view radiographic images (e.g., radiographs) and other film-based or transparency-based medical diagnostic images (e.g., CT or MRI images). These light boxes contain one or more light sources and a flat front panel comprising a light diffuser, such as a translucent white Plexiglass, and are dimensioned to handle a predetermined number of conventionally sized radiographs (e.g., about 14" by 17") to permit simultaneous viewing of one or more radiographs.

Proper radiograph interpretation, and the identification of any underlying ailment, disease, or malady, requires sufficient lighting, contrast, and resolution. If any one of the lighting, contrast, and resolution is less than optimal, radiographic interpretation is complicated and the ability of the radiologist to properly diagnose an underlying ailment, disease, or malady is reduced. Further, the added interpretive difficulty lengthens the amount of time devoted to radiographic analysis and increases, over time, the viewers fatigue, eye strain, and muscle stiffness.

Recent improvements to the conventional light boxes include, for example, U.S. Pat. Nos. 5,940,998 and 5,992,066 to Brauer. Although these and other conventional transparency illuminators or "light boxes" used in medical applications for reviewing radiographs (e.g., x-rays) or negative images may be effective for the local applications for which they were designed, a need exists for a light box or radiographic viewing device optimized for remote applications, such as telemedicine.

SUMMARY

Telemedicine relates to the use of telephony and/or other communication links (e.g., satellite) in combination with a camera (e.g., a still camera or a video camera) and/or a connected medical device or instrument (e.g., an electrocardiograph (ECG)) to convey sound, image, and data from a patient, health care provider, assistant, or object of interest in a first location (e.g., an "originating site") to a doctor or other health care provider in a second, distal, location (e.g., a "remote site") to enable the doctor or health care provider to evaluate, advise, treat and/or diagnose the patient and/or analyze or glean information from the object of interest. The present disclosure relates to medical diagnostic apparatuses, systems and methods adapted to efficiently utilize remote visual communication technology, such as that conventionally used in telemedicine or video-conferencing sessions.

In one aspect, a telesuite is provided and includes a camera rotatable about at least one axis, the camera being rotatably mounted to a base, and a radiograph viewing device. The radiograph viewing device includes a light source and a translucent substrate defining at least one radiograph viewing area. According to some embodiments, each radiograph viewing area of the translucent substrate is disposed substantially equidistant from the camera.

According to some embodiments, a radiographic viewing device comprises a light box including a light source and a curved translucent substrate. The curved translucent substrate defines at least one radiograph viewing area along a common radius and at least substantially approximates a spherical segment, a spherical curve, and/or a spherical cap.

According to other embodiments, there is provided a radiographic viewing system comprising a camera rotatable about at least one axis and being rotatably mounted to a base and a light box including a light source and a curved translucent substrate. The curved translucent substrate defines at least one radiograph viewing area along a common radius and at least substantially conforms to a spherical segment, a spherical curve, and/or a spherical cap.

In at least some other embodiments, a radiographic viewing system in accord with the present concepts includes a light source, at least one translucent substrate defining a plurality of radiograph viewing areas and disposed to pass light from the light source, and a camera movable with respect to said at least one translucent substrate, the camera being positionable to receive light emitted from the translucent substrate.

According to some embodiments, a radiographic viewing device includes a light box having a UV light source disposed therein. The light box also includes a translucent substrate having a photo-fluorescent material applied thereto, the translucent substrate defining at least one radiograph viewing area. In this configuration, UV radiation from the UV source is incident upon the translucent substrate fluorescent material and causes the fluorescent material to emit visible light. The translucent substrate may optionally be curved.

The above summary is not intended to represent each embodiment, or every aspect, of the presently disclosed concepts. Additional features and benefits of the presently disclosed concepts will become apparent from the detailed description, figures, and claims set forth below.

BRIEF DESCRIPTION OF THE DRAWINGS

FIGS. 5(a)-5(d) respectively represent an isometric view, a cross-sectional front view, a cross-sectional side view, and a top or plan view of a second example of a radiograph viewing device in accord with aspects of the present concepts.

DETAILED DESCRIPTION

The following description is exemplary of the disclosed concepts and advantageous aspects thereof, but is in no way intended to limit the scope of the disclosed concepts, its application, or uses.

Figure 1:
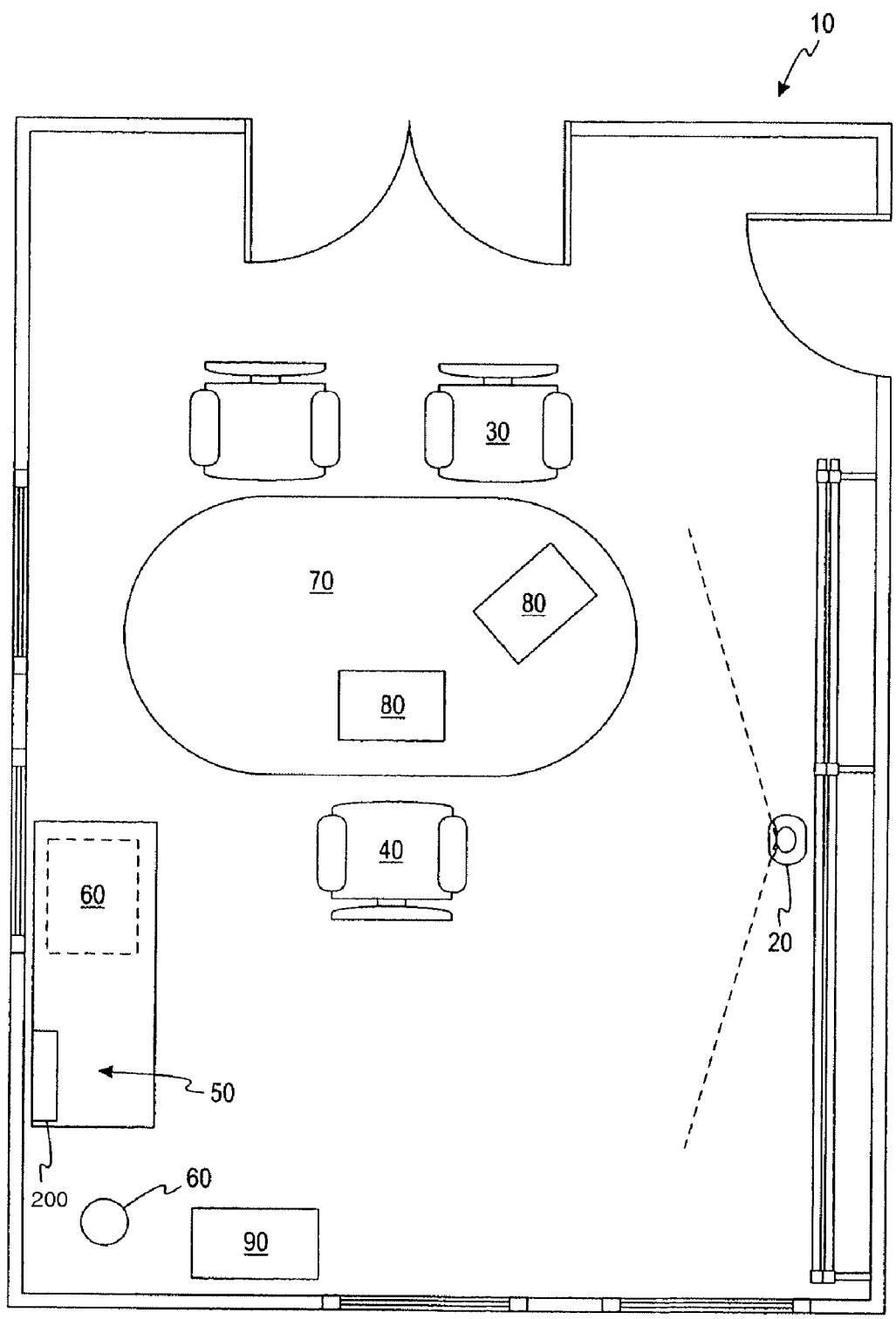
FIG. 1 shows an example of a telesuite incorporating a radiographic viewing device in accord with the present concepts.

FIG. 1 shows one example of an exemplary telesuite 10. In the illustrated example, the telesuite comprises a camera 20 and a number of predetermined viewing positions or areas, which may include a patient viewing area 30, a health care provider or practitioner viewing area 40, a radiograph viewing area 50 bearing a radiograph viewing device 200, a physical exhibit viewing device area 60, a desk top area 70, a computer monitor 80, and/or a medical display device viewing area 90.

The predetermined viewing position is defined, for example, by a set of predetermined coordinates in an appropriate coordinate system (e.g., cartesian (x, y, z) or polar (r, θ)) relative to a selected origin of the camera 20. The camera 20 controller may include any combination of motors, mechanisms, actuators, hardware, firmware, software, processor(s), and devices to permit movement and/or rotation of the camera to view any desired coordinate and focus thereupon, if necessary. The camera controller is adapted to rotate and/or move the camera 20 to view a designated radiograph viewing area 50 and/or radiograph viewing device 200 disposed therein upon receipt of a control signal instructing the camera to view the designated radiograph viewing area and/or radiograph viewing device, or portion thereof.

Once positioned, the camera will include within its field of view a designated area (i.e., a predetermined viewing area) surrounding the predetermined viewing position. The predetermined viewing position may be set, for example, by manually positioning the camera 20 to focus on a desired spot so encompassing a desired field of view and by saving the position(s) of the associated camera driving elements such as, but not limited to, using stepper motor position or motor encoders. The camera controller may thus be trained to automatically return to any one of a plurality of predetermined viewing positions upon receipt of an appropriate control signal from a user. The predetermined viewing positions may be saved remotely or locally, such as in a camera controller (not shown) memory, in a local computer 110 memory, or in a remote computer.

In one aspect, camera 20 could be disposed outside of and adjacent to telesuite 20, viewing an interior thereof through a transparent substrate such as a glass or plexiglass partition or window or through an opening. Multiple cameras 20 may also be provided in a single telesuite 10. In accord with the present concepts, a doctor or health care provider may be able to simultaneously or sequentially monitor one or more predetermined viewing positions in one or more telesuites disposed at any fixed or mobile site.

In accord with the present concepts, camera 20 is rotatable about at least one axis (e.g., a horizontal axis or a vertical axis) and may be advantageously mounted to a fixed structure such as, but not limited to, a wall, a ceiling, or other appurtenant structure attached thereto. The degree or range of rotation about this axis of rotation should be selected to traverse an arc (e.g., 0° to 360°) encompassing desired positions of interest within the originating site. Camera 20 is preferably rotatable about at two axes (e.g., a horizontal axis and a vertical axis or two perpendicular horizontal axes). Still more preferably, camera 20 is also provided with an optical and/or digital zoom capability (e.g., a 3× digital zoom) and may comprise a stereovision capability to permit visual perception in three dimensions.

In one aspect, camera 20 may comprise a model FW-1150 (FlexWATCH™) manufactured by Seyeon Technology, Ltd., of Seoul, Korea. This particular aspect of camera 20 is a stand-alone network camera server with built-in Pan/Tilt/Zoom camera and web server which delivers real-time live video at a rate up to about 30 fps over existing telephony systems and networks including, for example, telephone lines, LANs, Cable modems, and xDSL. The FW-1150 camera (e.g., 20) comprises a ⅓" Sony Super HAD CCD® with a 3.8 mm lens with a 3× digital zoom providing resolutions up to about 704×480 (NTSC) or 704×576 (PAL). FW-1150 camera (e.g., 20) is advantageously coupled to a FlexWATCH™ network video server and used in combination with FlexWATCH™ Voyager Software to enable operation of the camera viewing of multiple angles of a target location (e.g., "originating site") through a standard web browser using any conventional operating system.

Camera 20, as well as its associated software and control systems, may thus conveniently employ "off-the-shelf" components and systems selected for a particular applications and design constraints (e.g., cost, speed, resolution, etc.). In the present example, a physician in a remote location may use the camera to view, with very high resolution and fidelity, fine details of a radiograph mounted on a radiograph viewing device 200 in the radiograph viewing device area 50 from across the telesuite 10.

It is advantageous to enable operation of the camera 20 only after a potential user has suitably verified authorization to access the camera such as, but not limited to, conventional security devices including password protected server access, IP filtering, and image encryption.

Camera 20 may optionally be translatable as well as rotatable. For example, camera 20 may be mounted on a telescoping or otherwise vertically translating member, such as a drive member attached to a track, able to position a first camera at a range of heights (e.g., between about 1' off of the ground to about 10' off of the ground) to provide additional perspectives for each of the aforementioned predetermined viewing areas. As one example, the telescoping or otherwise vertically translating member may comprise a Televator elevating pedestal (EP-PT-S2), elevating wall mount (EWM-PT-S2), or extendable camera mount (ECM-PT-S2), each manufactured by Telemetrics, Inc. Similarly, camera 20 may be disposed to translate or move along a track that is straight or curved along any desired path necessary to position the camera with respect to the radiograph viewing device 200. Thus, camera 20 may travel horizontally, vertically, or along an arc or curve and may itself be translatable about one or more axes relative to such track via conventional actuators to provide additional degrees of freedom for camera positioning. In still another aspect, the camera 20 may be non-rotatable and non-translatable and the radiograph viewing device may itself be rotatable and/or translatable to place a specified radiographic viewing area within the cameras field of view.

Optionally, both the camera and the viewing area may be movable and may advantageously be arranged to move synchronously in opposite directions or angles to speed convergence of the camera on a viewed area of interest. For example, if the area of interest MRI film no. 5 and the camera is positioned at MRI film no. 1, the camera might otherwise need to rotate through an arc of about 172 cm (68 inches) or about 44° movement at a focal length of about 8 feet. If the viewing area is itself configured to move relative to the camera, the viewing area could be adapted to move in an opposite direction to the camera by a first distance and the camera would be adapted to move through an arc corresponding to a second distance, wherein the movement of the camera and the viewing area could be apportioned to minimize the time required to place the area of interest within the camera's field of view.

Figure 2:
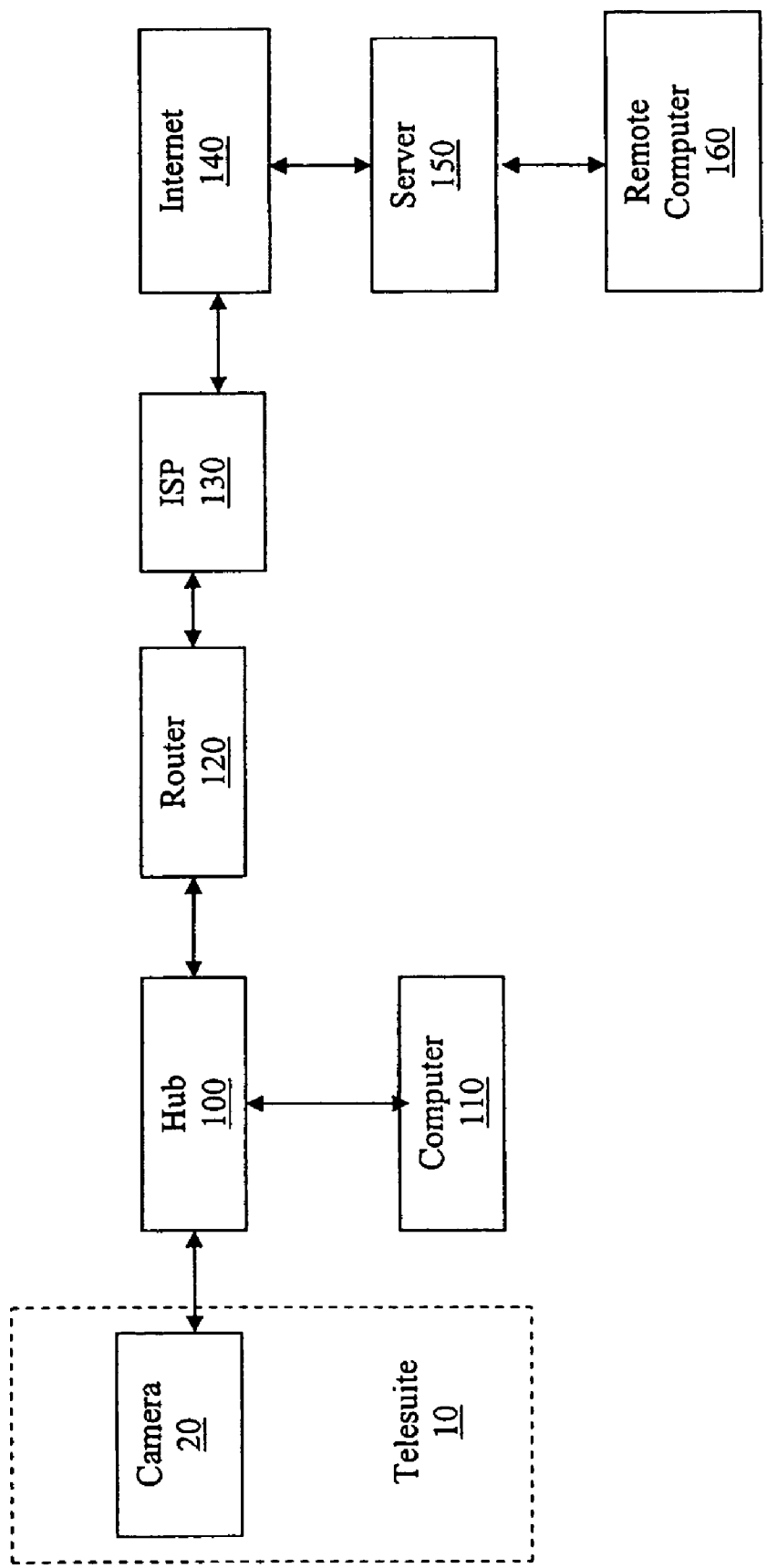
FIG. 2. shows an example of a camera and communications system which may be used in the telesuite of FIG. 1.

FIG. 2 is a block diagram that illustrates one example of a computer and communications system which may be advantageously used in accord with the present concepts. Camera 20 is shown disposed in telesuite 10 and is connected to a hub 100 which serves as the central point of a network and controls the flow of data. A local computer 110 may advantageously be attached thereto. A conventional router 120 is provided to link the local network comprising the camera 20 and hub 100 to another network (e.g., WAN, LAN) or remote computer 160 through an ISP 130 network. In an alternate configuration, a plurality of cameras 20 could be provided within one telesuite 10 or within multiple telesuites 10 and may be linked together as a separate LAN network using, for example, a LAN bridge, NTU (network terminal unit), or SDSL bridge or DSL bridge. Access to one or more cameras 20 may also be provided by means of a global static IP address, in which a private IP address may be assigned to a network device in the local network, using a leased line, cable modem and DSL, for example, such that any network device can be accessed from the internet. Other conventional network connections enabling control of camera 20 from a remote computer 160 are also included within the scope of the present concepts.

At least one of camera 20 and computer 110 comprise a processor and/or firmware adapted to execute sequences of software instructions contained in a memory thereof. Software instructions may be provided in any number of forms such as source code, assembly code, object code, machine language, compressed or encrypted versions of the foregoing, and any and all equivalents thereof. In alternative embodiments, hard-wired circuitry or firmware may be used in place of or in combination with software instructions and it is to be understood that no specific combination of hardware circuitry, firmware and software are required.

Router 120 includes a communication interface to provide a two-way data communication coupling the network including hub 100 and camera 20 to another network link. The communication interface may be an integrated services digital network (ISDN) card or a modem (e.g., cable/DSL modem) to provide a data communication connection to a corresponding type of communications line or wireless link (e.g., a wireless bridge). In any such implementation, the router 120 sends and receives electrical, electromagnetic or optical signals that carry digital data streams representing various types of information to and from another network, such as equipment operated by an Internet Service Provider (ISP) 130. ISP 130 in turn provides data communication services through the worldwide packet data communication network, now commonly referred to as the "Internet" 140. The signals through the various networks noted above, which carry the digital data to and from computer system 160 and one or both of camera 20 and computer 110, are exemplary forms of carrier waves transporting the information. Remote computer 160 may be located within the same building as camera 20 and/or computer 110 or may be located remotely.

The system of FIG. 2 can send and receive messages, signals, and data, including control or instruction signals and program code, through the network(s) connected to router 120. For example, remote computer 160 or server 150 might transmit a requested code for an application program through Internet 140, ISP 130, and router 120 to computer 110. The received code may be executed by a processor (e.g., associated with the camera 20 and/or computer 110) as it is received. In this manner, camera 20 and/or computer 110 may obtain application code or instructions in the form of a carrier wave.

Computer 110 may advantageously be connected to one or more local speakers and microphones (not shown), which may be disposed in the local health care provider's office telesuite 10, as shown in FIG. 1, or in an examination room telesuite (not shown), to provide 2-way audio capabilities. Additionally, if a conventional camera is operatively associated with or electrically connected to the remote 160 computer, the video signal of the remotely located doctor or health care provider may be transmitted or routed, such as through router 120, hub 100, and/or computer 110, to the computer monitor 80 located in the local health care provider's office telesuite 10, as shown in FIG. 1, or into a computer monitor located in an examination room telesuite to permit 2-way video communication.

In FIG. 1, the radiograph viewing device area 50 is a designated one of the predetermined viewing areas. In accord with the depicted telesuite 10, a camera 20 rotatable about at least one axis is provided. Camera 20 is rotatably mounted to or integrated with a base, which may itself be movable through conventional means such as, but not limited to, tracks, actuators, wheels, and movable members. If the base of the camera 20 is not fixedly mounted to a surface, such as a wall or a ceiling, it is preferred that the base include a conventional locking device or devices by which the base may be fixedly, if not repeatably, positioned relative to the radiograph viewing device area 50.

A radiograph viewing device 200 in accord with the present concepts may include, in one aspect, a light source(s) (not shown) disposed within a base 205, and one or more translucent substrates 210, the one or more translucent substrates 210 defining a plurality of radiograph viewing areas 220. The translucent substrate 210 may comprise any surface that is able to transmit light and may be transparent, translucent, semi-opaque, or even substantially opaque. Translucent, as used herein, includes any degree of transmittance between zero (opaque) and up to and including 100% (transparent). In one aspect, the material may comprise a low density, medium density, high density, or ultra-high molecular weight (UHMW) Polyethylene, a cyclic olefin copolymer (COC), a polycarbonate, a resinous material, glass, or another other material having a desired transmittance over wavelengths of interest. The desired transmittance or optical density characteristics of the translucent substrate 210 may be an inherent property of the substrate material or may be imparted thereto by conventional means including, but not limited to, application of one or more surfaces, coatings, layers, or treatments to the substrate.

In various aspects, the translucent substrate 210 may be planar, substantially planar, or curved. In accord with at least some aspects, the radiograph viewing device 200 translucent substrate(s) 210 define a plurality of radiograph viewing areas 220. In one preferred aspect, the translucent substrate(s) 210 are planar and are arranged relative to one another so that an overall degree of curvature of the radiographic viewing device 200 between the outermost opposing translucent substrate may be slight or even substantially imperceptible, but generally follows or conforms to an arc of substantially constant radius. Thus, in one preferred aspect, the translucent substrate(s) 210 are disposed to approximate the shape of, for example, a spherical segment, a spherical curve, or a spherical cap. The spherical cap includes the portion of a sphere which lies above (or below) a given plane and the spherical segment is a surface or solid defined by cutting a sphere with a pair of parallel planes (e.g., a truncated spherical cap). The term spherical curve includes any portion of a spherical surface. The exact nomenclature of the surface is not intended to be limiting in any respect, but rather is illustrative in nature.

Figure 5A:
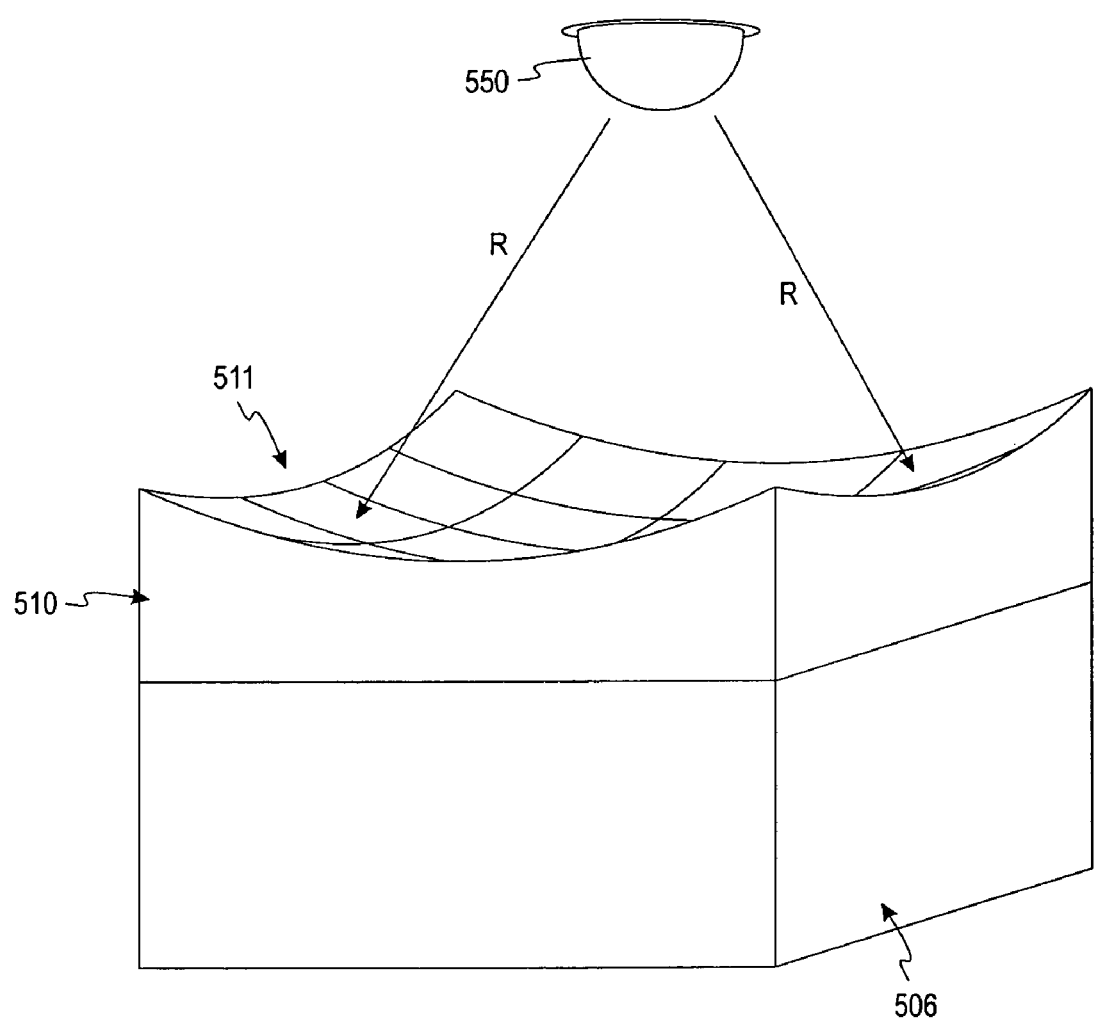
Figure 5D:
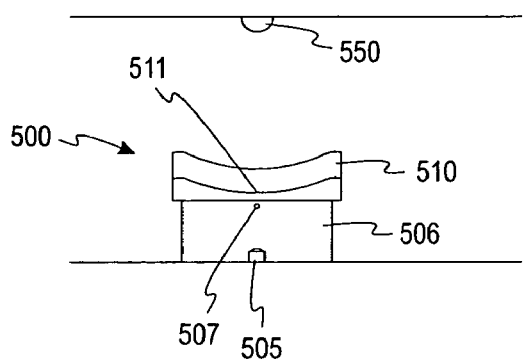
Figure 5D:
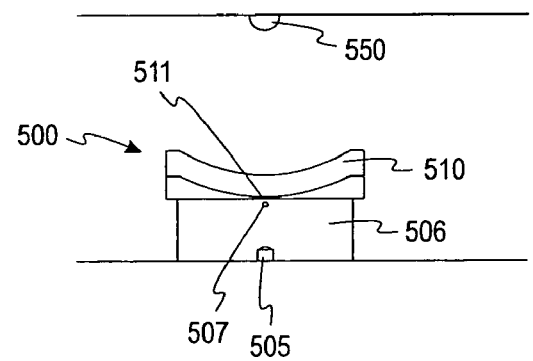
Figure 5D:
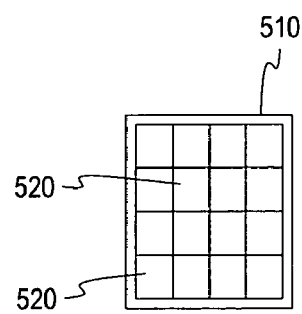

The shape of the radiograph viewing device 200 and translucent substrate 210 may be any desired regular (e.g., symmetric), curved, or irregular (e.g., asymmetric) geometric construct defining one or more levels. In at least some aspects, the radiograph viewing device 200 translucent substrate 210 may comprise a substantially rectangular or square configuration approximating or conforming to a substantially constant radius R arc, such as shown in FIG. 5(a) (e.g., an impression of a sphere on a solid). In various alternative aspects, the translucent substrate(s) 210 may be arranged to form a toroidal surface of revolution, a spherical curve, or a spherical segment, wherein radiograph viewing areas 220 defined by the translucent substrate(s) are disposed substantially equidistant from the camera 250. The radiograph viewing areas 220 may be divided into a plurality of groups, the radiograph viewing areas in each of the groups being disposed substantially equidistant from the camera, with each of the various groups being disposed at different distances from camera 250.

Figure 3:
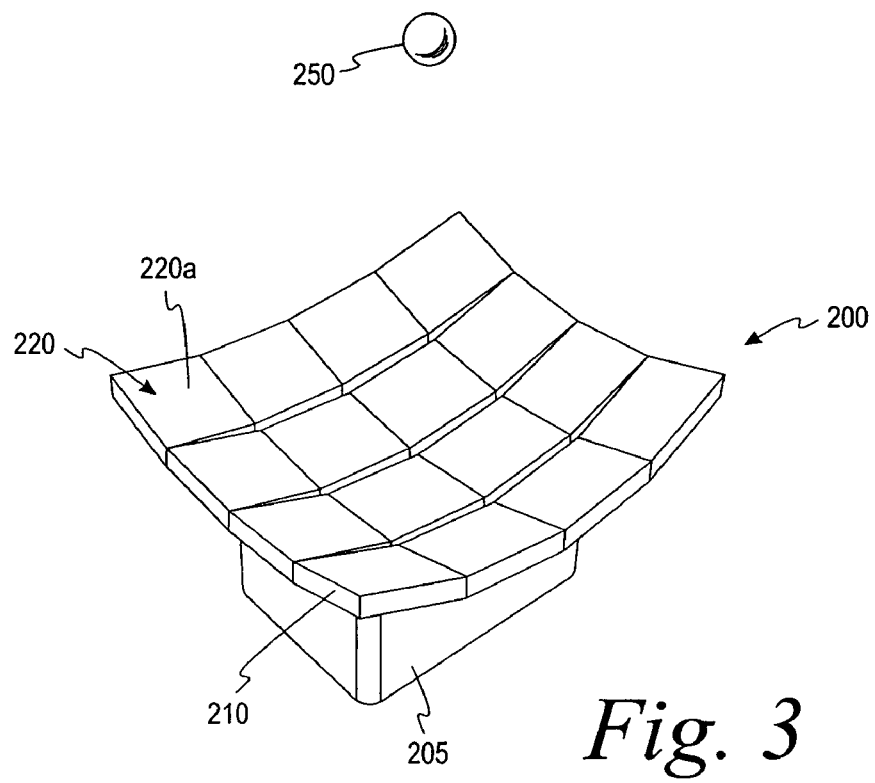
FIG. 3 shows an isometric view of a first example of a radiograph viewing device in accord with aspects of the present concepts.
Figure 4:
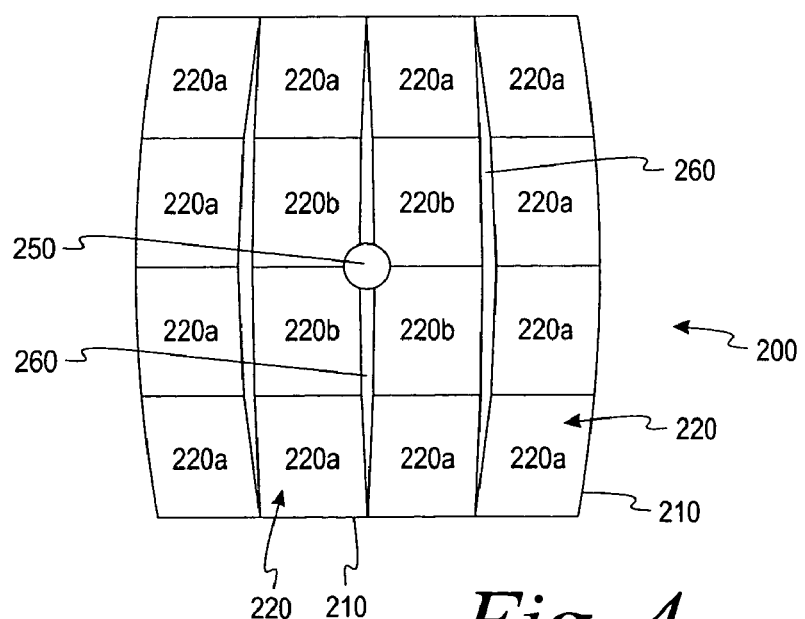
FIG. 4 shows a top view of the first example of a radiograph viewing device in accord with aspects of the present concepts.

The radiograph viewing device 200 depicted in FIGS. 3-4 is, in accord with at least some of the present concepts, disposed within a telesuite 10, as noted above. Alternatively, the radiograph viewing device 200, in accord with at least some of the present concepts, may be portably configured to facilitate deployment and use in various remote locations (e.g., disaster sites). In the illustrated examples, the radiograph viewing device area 50 containing the radiographic viewing device 200 is located opposite a camera 250 rotatably mounted to surface which may comprise, for example, the ceiling or wall of the telesuite. Camera 250 is preferably rotatably mounted directly above a center of the radiographic viewing device 200 (e.g., on the ceiling) via a suitable camera base or mount. The camera base or mount may be rotatable and/or translatable about a vertical axis. In essence, the camera may be provided with plural degrees of freedom and the camera generally configured to rotate and/or translate within any desired reference frame and no limitations are placed herein on the configuration of the camera or camera/base combination. Any conventional actuator(s) or mechanism(s) may be used to position the camera 250 in a desired position and orientation relative to the radiograph viewing device 200.

As shown in the example of FIG. 3, the outermost and uppermost translucent substrates 210 present each of the radiograph viewing areas 220a, 220b to the camera 250 at a substantially equal distance R. In one example, for an 8' ceiling, an upper surface of the translucent substrates 210 and corresponding radiograph viewing areas 220a are disposed on the base 205 approximately 5' (e.g. about 152 cm) from the camera 250. These dimensions represent only one embodiment and may be freely varied. In many applications, the outer or upper surface of the translucent substrate 210 will be disposed between about three feet and ten feet from the camera 250, although these distances are not limits and may in fact be higher or lower in accord with the requirements of the application and specifications of the camera and/or associated lens, software, and/or firmware.

Disposition of the upper surface of the translucent substrate 210 and radiograph viewing areas 220a, 220b at a substantially constant distance from the camera 250 is preferred, to minimize delays associated with refocusing the camera at different focal lengths, but is not required in accord with the present concepts. For example, in the arrangement of FIGS. 3-4, the radiograph viewing areas are arranged in an n×n array (e.g., a 4×4 array) with an upper surface of the translucent substrate(s) 210 being disposed at a substantially constant radius from the camera 250. In one variant in accord with the present concepts, a first grouping of radiograph viewing areas (e.g., 220a) on an outer portion of the radiograph viewing device 200 could be disposed at a first distance $R_1$ from the camera 250 and a second grouping of radiograph viewing areas (e.g., 220b) on an inner portion of the radiograph viewing device 200 could be disposed at a second distance $R_2$ from the camera, wherein the first and second distances are different. Accordingly, a plurality of groupings of radiograph viewing areas 220a-n may be provided with each of the groups being disposed at different defined distances from the camera 250. In view thereof, the upper surface of the translucent substrate 210 could comprise at least a portion defined by a locus consisting of a straight-line, a polynomial curve, or one or more contiguous or disparate lines or curve segments, wherein not all radiographic viewing areas 220a-n are disposed at an equal distance from the camera 250.

In at least some embodiments, the radiograph viewing area(s) 220 may be arranged in any n×n array or n×m array, wherein n and m may be any integer. The shape and the dimensions of the translucent substrate(s) 210 as well as the shape and size of the radiographs employed therewith will largely determine the size of the array. Moreover, each translucent substrate 210 may define one or more radiograph viewing area(s) 220 and may be configured, for example, to bear various combinations of radiograph sizes. For example, the outer radiographic viewing area 220a in FIG. 4 could be seen as a 1×n array (i.e., 1×12) and the inner radiographic Viewing area 220b could be seen as a separate n×n array (i.e., 2×2). In other aspects, the inner radiographic viewing area 220b could comprise an n×n or n×m array. The radiographic viewing areas need not be symmetric or equally or even continuously apportioned and the term array, as used herein, could comprise any combination(s) of or arrangement of radiographic viewing areas, such as combinations or arrangements of 1×1, 1×n, 1×m, n×n, and n×m arrays.

In one aspect of the present concepts, such as shown in FIG. 5(a)-(d), the radiograph viewing device 200 comprises a single translucent substrate 210 defining a plurality of radiographic viewing areas 220. In another aspect of the present concepts, the radiograph viewing device 200 may comprises a plurality of translucent substrates 210 substantially contiguously disposed to fully occupy or minimize spaces between adjacent translucent substrates so as to define, approximate, or conform to a spherical cap, or other desired configuration, with a minimal device footprint. In still other aspects of the present concepts, such as shown in FIGS. 3-4, the radiograph viewing device 200 and translucent substrate(s) 210 may be disposed so as to define spaces 260 therebetween between adjacent ones of the translucent substrate(s). These spaces 260 may be provided any number of sides of each of the translucent substrate(s) 210 (e.g., 1, 2, . . . n). The spaces 260 permit, in at least some aspects, independent positioning of each of the translucent substrates 210 relative to the other translucent substrates or independent positioning of connected groupings of translucent substrates relative to other connected groupings.

The translucent substrate(s) 210 may be formed or configured, in at least some aspects, to define an n×n or n×m array of substantially equally sized radiograph viewing areas 220. In one advantageous aspect, such array could comprise radiograph viewing areas 220 that are squares of about 43 cm×43 cm. This size will allow standard magnetic resonance imaging (MRI) films to be viewed effectively with a backlight illumination. Other aspects of the radiographic viewing device 200 could utilize radiograph viewing areas of a different size or radiograph viewing areas comprising a mixture of sizes and/or shapes or variable sizes and/or shapes. Radiograph viewing areas 220 may advantageously comprise mechanical clips, movable partitions, pins, suction device(s) (e.g., a plurality of small openings connected to a vacuum device, manifold, or chamber), and/or high-friction, non-abrasive surfaces to retain radiographs disposed thereon.

The light source (not shown) disposed within housing or base 205 may comprise a conventional incandescent source(s), white LED source(s)/emitter(s) (e.g., a white LED panel or array, or ultraviolet (UV) light source(s). For the latter of these embodiments, an optical white UV sensitive paint, preferably with a high pigment concentration, may be disposed on a translucent substrate 210. One example of a suitable UV sensitive paint includes the optical white paint (PNT-191) manufactured by Wildfire Lighting & Visual Effects of Los Angeles, Calif. A protective clear coat layer may optionally be provided over the UV sensitive paint. Such protective clear coat layer would necessarily pass UV of a predetermined spectrum (e.g., UV-A) to permit interaction of such UV light with the UV sensitive paint. The optical white UV sensitive paint may be disposed between two plates, sheets, or panels collectively defining a translucent substrate 210.

In accord with some embodiments, a radiograph viewing device 200 may include a light source comprising any essentially benign radiation emitter (e.g., visible light or non-visible radiation) and, for non-visible radiation, at least one of the radiograph viewing device 200 and the translucent substrate 210 comprises a material that is luminescent or fluorescent or exhibits luminescence or fluorescence in a visible wavelength to output a white light (e.g., a mixture of the colors of the visible spectra), a subset of wavelengths (e.g., between about 400-420 in the violet spectra), or even a single wavelength, alone or in combination with one or more filtering elements, devices or coatings. Thus, in a general sense, a radiographic viewing device 200 in accord with the present concepts may comprise a light box bearing a UV light source and a translucent substrate 210 having a fluorescent material applied thereto or embedded therein, wherein UV radiation incident upon the translucent substrate fluorescent material causes the fluorescent material to emit visible light which is then output through the translucent substrate to illuminate a radiograph viewing area.

Additionally, as an additional measure to preserve patient privacy, the camera provided in any aspects of the presently disclosed concepts, such as those embodied in any of the examples FIGS. 1-6(b) may be provided with a movable shield to cover the camera lens and/or to insert between the camera and a space occupied by a patient. Thus, an obstacle between such patient and the camera or camera lens, at least generally proximal to the camera, can provide visual confirmation to the patient that they are not within the camera's field of view. In one aspect, the camera shield may comprise a concave bowl of any geometric shape (e.g., hemisphere, square or rectangular box, etc.) which partially circumscribes a space about the camera and which comprises an opening. In the case of a hemispherical camera shield, the opening could comprise a spherical curve such as, but not limited to, a 45° or 90° arc section removed from each side of a camera lens center line. The shape and size of the opening may be freely varied so long as the minimum size of the opening provides a desired field of view for a particular application.

In one embodiment, the aforementioned camera shield is rotatably mounted to either a camera mount or to the ceiling or other structure to which the camera mount is attached to permit rotation of the camera shield relative to, or even with, the camera. For example, a base of the camera shield could be attached within or to a conventional rotary bearing or joint. The camera shield could be passive, wherein rotation of the camera causes a corresponding rotation of the camera shield, such as by some physical connection or impediment that permits the camera motion to be transferred simultaneously to the camera shield. The camera shield could also be active, comprising a separate driving device (e.g., an actuator or motor) and a controller (e.g., IR receiver, signal processor, and/or processor, etc.) selectively controllable by a user (e.g., using an IR transmitter or using a networked or a direct connection to the driving device). In accord with this configuration, the camera shield may be rotated to visibly occlude the camera's view of the patient and the patient's space. In another aspect, an external movable shutter, such as an IR controlled shutter drawing power from a battery or from the camera's power source, may be provided to the same effect.

FIGS. 5(a)-5(d) respectively show an isometric view, a front view, a side view, and a top or plan view of another example of a radiograph viewing device 500 in accord with aspects of the present concepts. The radiograph viewing device 500 depicted in FIGS. 5(a)-(d) includes a light source 505 (e.g., one or more white LED or incandescent sources). As shown in FIGS. 5(b)-(c), the light source 505 may advantageously comprise an incandescent light disposed within a cabinet 506 which bears the translucent substrate 510. If cabinet 506 is substantially closed, at least one vent (not shown), channel, fan, and/or heat sink, or combination thereof, may be provided to permit dissipation of the heat generated within the cabinet by the light source 505. One or more slits or openings (not shown) may also be provided to promote air flow and facilitate convective heat dissipation.

In the embodiment shown in FIGS. 5(a)-(d), the translucent substrate 510 comprises a curved shape, but may be formed in other shapes including, but not limited to, a plurality of planar or substantially planar shapes approximating one or more curved surfaces or shapes. As shown in FIGS. 5(a)-(d), the radiograph viewing device 500 radiograph viewing areas 520 are disposed about the outer or upper surface 511 of the translucent substrate 510 at a substantially equal distance R from the camera 550. As in the previous example, one suitable range of distances R may be between about three feet to ten feet and, more preferably between approximately five feet to six feet (e.g., 5'9"), but the distance R may be freely adjusted to any point within or outside of these ranges. In the aspect of the radiograph viewing device 500 depicted in FIGS. 5(a)-5(d), the translucent substrate 510 comprises a 4×4 array of radiograph viewing areas 520, which may advantageously comprise a 1'2" by 1'5" rectangle.

Figure 6A:
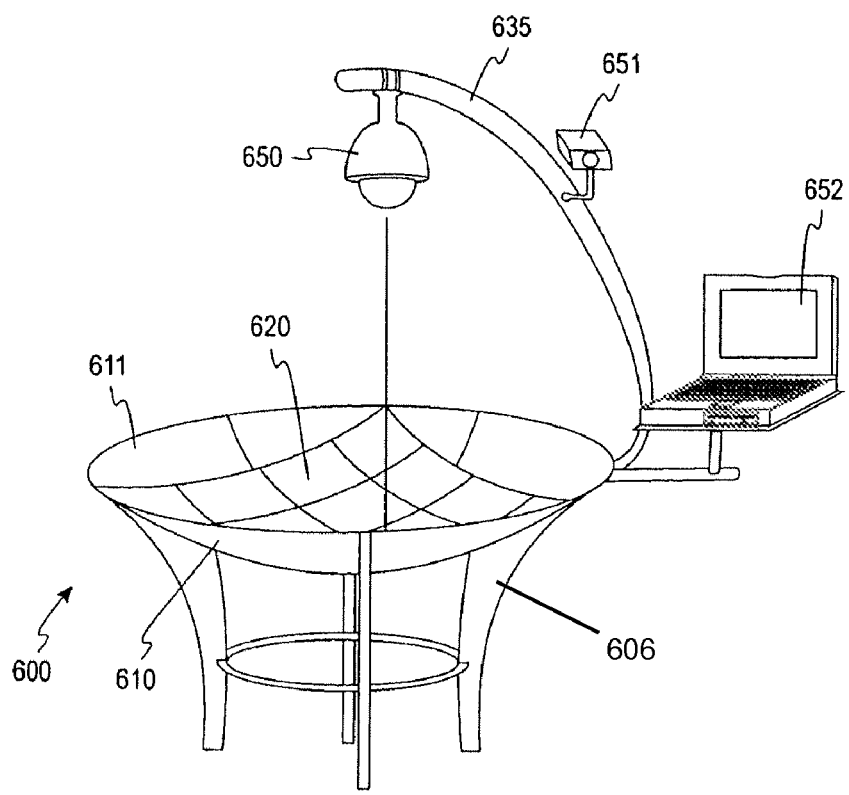
FIGS. 6(a)-6(b) respectively show an isometric view and a top or plan view of a third example of a radiograph viewing device in accord with aspects of the present concepts.
Figure 6B:
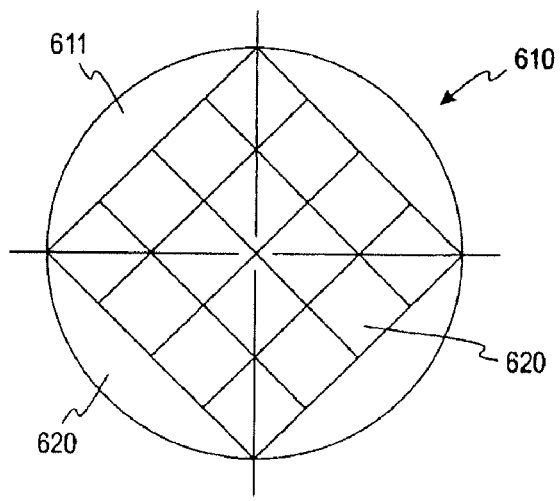

FIGS. 6(a)-6(b) respectively show an isometric view and a top view of an example of a portable radiograph viewing device in accord with aspects of the present concepts. The radiograph viewing device 600 depicted in FIGS. 6(a)-(b), as with previous embodiments, includes a light source, such as an incandescent or LED source (not shown), disposed within or on a stand 606 configured to bear a translucent substrate 610 defining a plurality of radiograph viewing areas 620.

As shown in the top view of FIG. 6(b), the outer periphery of the translucent substrate 610 is curved (i.e., substantially circular as shown) and an upper surface 611 thereof defines a plurality of radiograph viewing areas 620 at a substantially equal distance R from the camera 650. Camera 650 is a high resolution camera (e.g., an 18× or a 27× optical zoom camera) rotatable along at least one axis, and is preferably rotatable along a plurality of axes. The distance R may be practicably set to a distance of up to about five to six feet, although a lesser distance or greater distance may also be used. The translucent substrate 610 comprises, as shown in FIG. 6(*b*), a 4×4 array of square radiograph viewing areas 620. The number and size of both or either of the translucent substrate and radiograph viewing areas may be freely varied.

In the aspect of the present concepts depicted in FIGS. 6(*a*)-(*b*), the portable or deployable radiographic viewing device 600 is advantageously configured and packaged together with the illustrated components, or the like, inclusive of a camera 650, camera controller, processor (e.g., a processing device having at least one processor, such as a laptop computer 652 or handheld computer), monitor, communication device (e.g., modem in combination with hardwired I/O port or wireless port, satellite communication device, radiofrequency communication device, carrier wave transmitting/receiving device, etc.), and/or other components in a unit or kit to permit rapid assembly for mobile or remote uses or for shipment to and turn-key use by an end-user facility. Some or all of the components could be pre-assembled to permit rapid deployment. In one aspect, a pre-assembled remote medical center in accord with the present concepts and including the disclosed radiographic viewing device 600 can be rapidly deployed to a theatre of military operation or any other area of urgent need (e.g., disaster relief center).

As shown in FIGS. 6(*a*)-(*b*), camera 650 is rotatably mounted to an arm 635 is disposed over the general vicinity of the center of the translucent substrate 610 and, still more preferably, over the immediate vicinity of the center of the translucent substrate and, even more preferably, over the center point of the translucent substrate. An optional fixed camera 651 may be positioned, for example, to provide a view of an operator of the radiographic viewing device 600 so as to permit two-way, face-to-face remote communication.

As with the previous embodiments, the camera 650 may generally be positioned anywhere with respect to the translucent substrate 610 that would permit positioning of the camera to view at least one, a plurality of, and/or all of the radiograph viewing areas 620, but is optimally disposed over the center point of the translucent substrate so as to permit viewing of all of the radiograph viewing areas 620 from a similar vantage point. Arm 635 may comprise a single, arcuate member as shown, or may comprise a plurality of arcuate or straight members. Such additional members may provide enhanced rigidity and stability to the camera 650 so as to prevent vibration or oscillation of the camera. For example, in various alternative configurations, the arm 635 may traverse a 180° arc to connect to the opposing side of the translucent substrate 610 or may comprise a plurality of straight or arcuate members connected at one or more points to form a tripod or other rigid structure to which the camera 650 may be securely mounted or suspended.

To facilitate assembly, disassembly, and packaging of the radiographic viewing device 600, translucent substrate 610 may be formed in a plurality of separate pieces (e.g., arc segments). For example, in FIGS. 6(*a*)-(*b*), the translucent substrate 610 could be divided a plurality of equally sized pieces (e.g., 4-90° arc pieces or 8-45° arc pieces) or into a plurality of dissimilar pieces. These separate pieces can be connected together using conventional mechanical fasteners such as, but not limited to, latches or male/female connectors, flanges for screws/nuts, and/or slot and key connectors disposed on the sides of or on an underside of the translucent substrate 610 outside of the viewing area of the assembled translucent substrate (e.g., between adjacent radiograph viewing areas 620). In another aspect, the translucent substrate 610 could comprise a substantially rigid material and the pieces thereof could be rotatably disposed about a common axis to permit such pieces to rotate and slightly translate relative to one another to permit the pieces to fold or nest upon one another in the manner of a folding fan or a folding parabolic mirror or antenna. In yet another aspect, to facilitate folding of the translucent substrate 610, the substrate could comprise a substantially flexible, yet durable translucent material (e.g., a plastic or polymer) having a plurality of ribs adapted to unfold in an arc in the manner of an automobile convertible top. The particular nature of the substrate's 610 folding can encompass any conventional method and device of folding, nesting, or disassembly to facilitate mobility of the radiographic viewing device 600.

Arm 635 may also be equipped with mounting brackets for an optional fixed camera 651 and the processor or laptop computer. In one alternative embodiment, the necessary software and instructions to drive the camera may reside within a solid-state or non-volatile memory associated with the structure of the radiographic viewing device 600 and appropriate electrical connections are provided so that a remote user can simply hook-up their own laptop computer and access and utilize such resident memory as an external source. Stated differently, the functionality of the processing device(s), camera controller(s), and communications device(s) may be centralized or distributed and may be modularized for selective inclusion in or exclusion from a corresponding radiographic viewing device 600 unit or kit, based upon the needs of the end user. In like fashion, the radiographic viewing device 600 may be configured to facilitate modular connection of any one of a variety of communications device(s) to suit a particular end use and/or to be reconfigurable to permit use in a variety of end uses. For example, one application might require only communication through a conventional modem or a LAN system (e.g., a 10bT connection), whereas another application might necessitate a conventional satellite, radio-based, or other carrier-wave based communication device.

Each of the above-described embodiments and obvious variations thereof is contemplated as falling within the spirit and scope of the disclosure, set forth in the following claims. Additional variations considered to fall within the present concepts include a radiographic viewing device comprising a fixed camera and a movable translucent substrate defining a plurality of separate radiographic viewing areas which are selectively movable into the field of view of the camera (e.g., by rotation and/or translation). This set-up would facilitate rapid removal of the viewed radiographs and rapid insertion of the radiographs yet to be viewed without disturbing the set up of the camera or inadvertently moving objects (i.e., hands, fingers, clothing) into the field of view of a radiograph that is being viewed. Thus, this configuration could serve to minimize any potential unintended distractions to the viewing physician. Such radiographic viewing device could also output a signal (e.g., a tonal signal or message) to a doctor to let the viewing physician know that a selected radiograph has been cued up and is in-position for immediate viewing. This would permit physicians to effectively multi-task during any delay between the request for viewing of a particular radiograph and the actual positioning of the radiograph on the radiograph viewing device without the need for the physician to continually glance at a screen to see if the requested radiograph is presented.

In yet another variation, the radiographic viewing device comprising a plurality of separate radiographic viewing areas could itself be static and the camera 250 configured to translate within or along a track to bring the camera to bear on a selected radiographic viewing area.

In still another variation of the present concepts, a physician in a remote location may use the camera (e.g. 20) to view details of a radiograph mounted on a radiograph viewing device (e.g. 200) in a radiograph viewing device area (e.g. 50) using a projector adapted to project image data received from the camera 20 or other downstream component (e.g., hub 100, local computer 110, router 120, network, remote computer 160, ISP 130, etc.).

A physician in a remote location may further be permitted in accord with the present concepts to use a handheld electronic device (e.g. cellular phone, PDA, etc.) to access a camera (e.g. 20) to view a radiograph mounted on a radiograph viewing device (e.g. 200)

Moreover, in any of the above disclosed aspects, a radiograph need not necessarily be physically disposed on a radiograph viewing device 200 at the time at which the remote physician, or other individual, accesses the image. The radiograph viewing device 200 may be used to digitize a radiograph in high-definition (or even one of a plurality of selectable definitions corresponding to the highest fidelity of a device configured for viewing at a receiving end) for storage on a computer readable medium (e.g. hard-drive, optical disc, magnetic tape, optical storage device, magnetic storage device, memory chip, or any other type of non-volatile media). The remote physician may then access the file(s) corresponding to a desired radiograph or radiographs and view the associated radiograph(s) or portions thereof. For example, a first file of the radiograph may be stored in a low resolution and could be highlighted with or supplemented by a index or key permitting the remote physician to specify a region or regions of interest in the radiograph. High resolution images could then be transmitted to the remote physician's viewing device (e.g., computer screen, projector, handheld device, etc.). By utilizing a multi-resolution tiering system, remove physicians may be permitted to more rapidly assess a number of radiographs by more particularly specifying exactly which portions of a radiograph or radiographs of interest are required for detailed viewing. This would advantageously reduce data transmission times by permitting selective excision of non-essential portions of the high-resolution image data.

Each of the above-described embodiments and obvious variations thereof is contemplated as falling within the spirit and scope of the disclosure, set forth in the following claims.

What is claimed:

1. A telesuite, comprising:
    a camera rotatable about at least one axis, said camera being rotatably mounted to a base at a first location in the telesuite;
    a radiograph viewing device disposed at a second location in the telesuite different than the first location, the radiograph viewing device having a light source and a curved translucent substrate defining a plurality of radiograph viewing areas; and
    a camera controller configured to rotate said camera relative to the base to view a designated radiograph viewing area upon receipt of a control signal instructing the camera to view the designated radiograph viewing area,
    wherein each radiograph viewing area of the translucent substrate is disposed substantially equidistant from the camera,
    wherein said camera is rotatable about at least two axes,
    wherein the translucent substrate defines a spherical segment, a spherical curve, or a spherical cap or comprises a plurality of translucent substrates arranged to at least generally approximate a spherical segment, a spherical curve, or a spherical cap.

2. A radiographic viewing device comprising: a light source;
    at least one translucent substrate disposed to pass light from the light source,
    wherein the translucent substrate defines a plurality of radiograph viewing areas, and
    wherein the translucent substrate is curved and approximates a spherical segment, a spherical curve, or a spherical cap,
    wherein the plurality of radiograph viewing areas comprises at least two radiograph viewing areas that have a different size or shape.

3. A radiographic viewing device according to claim 2, wherein the radiograph viewing areas are arranged in an array.

4. A radiographic viewing device according to claim 2, wherein the light source comprises a UV source, an incandescent source, an LED source, a fluorescent source, or a photo fluorescent source.

5. A radiographic viewing device according to claim 4, wherein the light source is disposed in a light box and the translucent substrate is disposed over an open end of the light box.

6. A radiographic viewing device according to claim 2, wherein a radius defining said spherical segment, spherical curve, or spherical cap originates at a distance between about three feet and ten feet from the curved translucent substrate.

7. A radiographic viewing system:
    a light source;
    at least one translucent substrate defining a plurality of radiograph viewing areas and disposed to pass light from the light source, the at least one translucent substrate comprising a substrate defining a spherical segment, a spherical curve, or a spherical cap or a plurality of translucent substrates arranged to at least generally approximate a spherical segment, a spherical curve, or a spherical cap; and
    a camera movable with respect to said at least one translucent substrate, said camera being positionable to receive light emitted from said translucent substrate.

8. A radiographic viewing system according to claim 7, wherein said plurality of radiograph viewing areas are disposed along a common radius to the camera.

9. A radiographic viewing system according to claim 7, wherein said plurality of radiograph viewing areas comprises at least a first group of radiograph viewing areas disposed along a first radius to the camera and a second group of radiograph viewing areas disposed along a second radius to the camera, and wherein each of said first group of radiograph viewing areas and second group of radiograph viewing areas comprises at least one radiograph viewing area.

10. A radiographic viewing system according to claim 7, further comprising:
    a camera controller configured to move said camera by translation, rotation, or translation and rotation to view a designated radiograph viewing area upon receipt of a control signal instructing the camera to view the designated radiograph viewing area.

* * * * *